(12) United States Patent
Alger et al.

(10) Patent No.: US 7,439,284 B2
(45) Date of Patent: *Oct. 21, 2008

(54) METHOD OF MAKING POLY(ARYLENE ETHER) COMPOSITIONS

(75) Inventors: Montgomery M. Alger, Schenectady, NY (US); Robert Hossan, Delmar, NY (US); Torben P. Kempers, Bergen op Zoom (NL); Geoffrey H. Riding, Castleton, NY (US); David J. Swanson, Stuyvesant Falls, NY (US); Michael L. Todt, Rexford, NY (US)

(73) Assignee: Sabic Innovative Plastics IP B.V. (NL)

( * ) Notice: Subject to any disclaimer, the term of this patent is extended or adjusted under 35 U.S.C. 154(b) by 564 days.

This patent is subject to a terminal disclaimer.

(21) Appl. No.: 10/815,881

(22) Filed: Mar. 31, 2004

(65) Prior Publication Data

US 2005/0228077 A1  Oct. 13, 2005

(51) Int. Cl.
*C08J 3/22* (2006.01)
*C08J 3/00* (2006.01)

(52) U.S. Cl. .................... 523/351; 523/353
(58) Field of Classification Search ............. 523/351, 523/353
See application file for complete search history.

(56) References Cited

U.S. PATENT DOCUMENTS

| | | | |
|---|---|---|---|
| 2,071,250 A | 2/1937 | Carothers | |
| 2,071,251 A | 2/1937 | Carothers | |
| 2,130,523 A | 9/1938 | Carothers | |
| 2,130,948 A | 9/1938 | Carothers | |
| 2,241,322 A | 5/1941 | Hanford | |
| 2,312,966 A | 3/1943 | Hanford | |
| 2,512,606 A | 6/1950 | Bolton et al. | |
| 2,933,480 A | 4/1960 | Gresham et al. | |
| 3,093,621 A | 6/1963 | Gladding | |
| 3,211,709 A | 10/1965 | Adamek et al. | |
| 3,379,792 A | 4/1968 | Finholt | |
| 3,646,168 A | 2/1972 | Barrett | |
| 3,790,519 A | 2/1974 | Wahlborg | |
| 3,884,993 A | 5/1975 | Gros | |
| 3,894,999 A | 7/1975 | Boozer et al. | |
| 4,059,654 A | 11/1977 | Von Bodungen et al. | |
| 4,166,055 A | 8/1979 | Lee, Jr. | |
| 4,254,775 A | 3/1981 | Langer | |
| 4,584,334 A | 4/1986 | Lee, Jr. et al. | |
| 4,831,115 A | 5/1989 | Golba, Jr. et al. | |
| 4,992,222 A | 2/1991 | Banevicius et al. | |
| 5,102,591 A | 4/1992 | Hasson et al. | |
| 5,204,410 A | 4/1993 | Banevicius et al. | |
| 5,258,455 A | 11/1993 | Laughner et al. | |
| 5,262,476 A * | 11/1993 | Laughner | 525/67 |
| 5,270,386 A * | 12/1993 | Laughner | 525/66 |
| 5,382,627 A | 1/1995 | Yoshimura et al. | 525/132 |
| 6,258,879 B1 * | 7/2001 | Adedeji et al. | 524/127 |
| 6,306,953 B1 | 10/2001 | Fortuyn et al. | 524/508 |
| 6,350,804 B2 * | 2/2002 | Adedeji et al. | 524/445 |
| 6,352,654 B1 * | 3/2002 | Silvi et al. | 252/511 |
| 6,353,050 B1 * | 3/2002 | Bastiaens et al. | 524/538 |
| 6,486,244 B2 | 11/2002 | Adedeji et al. | |
| 6,627,701 B2 * | 9/2003 | Adedeji et al. | 525/68 |
| 6,822,026 B2 * | 11/2004 | Jung et al. | 524/141 |
| 6,908,964 B2 * | 6/2005 | Adedeji et al. | 525/68 |
| 6,946,084 B2 * | 9/2005 | Nakagawa et al. | 252/500 |

FOREIGN PATENT DOCUMENTS

EP  0 375 968  4/1990
GB  2 043 083 A  10/1980

OTHER PUBLICATIONS

International Search Report for International Application No. PCT/US2005/010143, Mailed Jan. 8, 2005.

* cited by examiner

*Primary Examiner*—Tae H Yoon
(74) *Attorney, Agent, or Firm*—Cantor Colburn LLP

(57) ABSTRACT

A method of making a thermoplastic composition comprises melt mixing a concentrate comprising a first thermoplastic, a second thermoplastic and an additive with a component selected from the group consisting of a third thermoplastic, fire retardant additive, reinforcing agent, electrically conductive filler, non-electrically conductive filler and combinations of two or more of the foregoing.

23 Claims, No Drawings

METHOD OF MAKING POLY(ARYLENE ETHER) COMPOSITIONS

BACKGROUND OF INVENTION

This disclosure relates to methods of making poly(arylene ether) compositions. In particular, the disclosure relates to methods of making poly(arylene ether) compositions in an economical, efficient manner.

Poly(arylene ether) is a thermoplastic material that is widely used due to a broad range of desirable properties. In some instances, particularly food related applications, there is a desire for a more efficient manner of producing poly(arylene ether) compositions with a low level of volatile, odiferous compounds. Additionally, there is a general desire to produce poly(arylene ether) compositions in a more efficient manner. Currently, poly(arylene ether) compositions are typically produced in a batchwise manner, with the typical delays associated with a batch process.

Accordingly there is a need for a more efficient method of producing poly(arylene ether) compositions, particularly poly(arylene ether) compositions having low levels of volatile, odiferous compounds.

BRIEF DESCRIPTION OF THE INVENTION

The aforementioned need is met by a method of making a thermoplastic composition comprising melt-mixing a concentrate comprising a first thermoplastic, a second thermoplastic and an additive with a component selected from the group consisting of a third thermoplastic, fire retardant additive, reinforcing agent, electrically conductive filler, non-electrically conductive filler, impact modifier, and combinations of two or more of the foregoing.

DETAILED DESCRIPTION

A method of making a thermoplastic composition comprises continuously melt-mixing a concentrate comprising a first thermoplastic, a second thermoplastic and an additive with a component selected from the group consisting of a third thermoplastic, fire retardant additive, conductive filler, non-conductive filler, reinforcing agent, impact modifier and combinations of two or more of the foregoing. The first thermoplastic is different from the second thermoplastic, preferably differing in chemical structure not merely molecular weight. The third thermoplastic may be the same as or different from the first or second thermoplastic. The concentrate may optionally comprise an impact modifier. When a third thermoplastic is present the composition may further comprise a blowing agent. Use of a concentrate permits the production of thermoplastic compositions in a more efficient and economical manner with less waste. In one embodiment the first thermoplastic comprises poly(arylene ether) and the second thermoplastic and third thermoplastic are selected from the group consisting of poly(alkenyl aromatic) resin, polyamide, polyolefin and combinations of two or more of the foregoing.

As used herein a concentrate contains an amount of the first thermoplastic and additive(s) that is higher than is found in the final composition. The amount of the second thermoplastic may be higher, lower or the same as that found in the final composition.

The terms "first," "second," and the like, herein do not denote any order or importance, but rather are used to distinguish one element from another. The terms "a" and "an" herein do not denote a limitation of quantity, but rather denote the presence of at least one of the referenced item.

In one embodiment the concentrate comprises a dry blend of the first thermoplastic, second thermoplastic and an additive. The dry blend may be stored until needed, shipped to a second location, or fed directly to an extruder. The term dry blend, as used herein, describes a blend produced by mixing the components at a temperature below the melt temperature of the first and second thermoplastics. The additive(s) may be in particulate or liquid form. The dry blend may be continuously added to a melt-mixing device such as an extruder or kneader. The component melt mixed with the concentrate (referred to herein as the additional component) may also be continuously added to the melt in an amount sufficient to obtain the desired properties in the final composition. The additional component may be added with the dry blend concentrate (at the feedthroat of an extruder) or sequentially (downstream in an extruder). Alternatively, the additional component may be added initially (at the feedthroat) and the dry blend concentrate added subsequently (downstream). In one embodiment the additional component comprises a third thermoplastic. If the composition comprises more than one additional component they may be added together or separately. Changing the amount and/or identity of the additional component being added can simply and easily vary the makeup of the extruded composition. Thus differing grades of a material can be produced without shutting down the production line. During the switch to producing a different composition the produced material may be fed back to the melt-mixing device to prevent waste. The amount of material that is fed back to the melt mixing device depends upon the design of the device (screw speed and screw design in the case of an extruder) and can be readily determined by one of ordinary skill in the art.

In another embodiment the concentrate comprises a pelletized blend of the first thermoplastic, second thermoplastic and additive(s). The concentrate is melt mixed and pelletized. The pellets may then be stored until needed, shipped to a second location if necessary, and fed to a melt mixing device or fed directly to a second melt mixing device such as an extruder or kneader. The pelletized blend may be fed continuously to the melt-mixing device. The additional component may also be added continuously in an amount sufficient to obtain the desired properties in the final composition. The additional component may be added simultaneously with the pelletized blend or the pelletized blend and additional component may be added sequentially. When added sequentially either the pelletized blend or the additional component may be added first. In one embodiment the additional component comprises a third thermoplastic. If the composition comprises more than one additional component they may be added together or separately. Changing the amount and/or identity of the additional component being added can simply and easily vary the makeup of the final composition. Thus differing grades of a material can be produced without shutting down the production line. During the switch to producing a different composition the produced material may be fed back to the melt-mixing device to prevent waste. The amount of material that is fed back to the melt mixing device depends upon the design of the melt mixing device (screw speed and screw design in the case of an extruder) and can be readily determined by one of ordinary skill in the art.

Alternatively, the pelletized concentrate, and additional component may be dry blended, added to an injection molder and injection molded or added to the injection molder directly without prior mixing and injection molded.

When a pelletized concentrate is employed the resulting thermoplastic composition has a low odor level, particularly odors associated with butyraldehyde, trimethylanisole and toluene. Butyraldehyde can be detected by the human nose at a concentration as low as 9 billion parts by weight in water. Interestingly, butyraldehyde concentration typically increases after the first compounding, particularly when compounded at temperatures greater than or equal to 300° C. A second compounding step can decrease the butyraldehyde concentration by about 50% or more. A decrease in the butyraldehyde concentration is useful particularly in articles to be used with food and beverages since smells can have a significant impact on organoleptic properties. In compositions prepared using the pelletized concentrate the butyraldehyde level is less than or equal to about 800 parts per million by weight, based on the total weight of the poly(arylene ether). Within this range, the butyraldehyde level may be less than or equal to about 500, or, more specifically, less than or equal to about 200 parts per million by weight.

The level of trimethylanisole may be less than or equal to about 30 parts per million by weight, based on the total weight of the poly(arylene ether). Within this range, the trimethylanisole level may be less than or equal to about 5, or, more specifically, less than or equal to about 1 parts per million by weight.

The level of toluene may be less than or equal to about 100 parts per million by weight, based on the total weight of the poly(arylene ether). Within this range, the toluene level may be less than or equal to about 50, or, more specifically, less than or equal to about 20 parts per million by weight.

In another embodiment, the components of the concentrate are directly and continuously added to a melt mixing device and melt mixed. The additional component may also be added continuously to the melt mix in an amount sufficient to obtain the desired properties in the final composition. The additional component may be added simultaneously (at the same location as the concentrate components in an extruder) or sequentially (either upstream or downstream of the concentrate in an extruder). In one embodiment the additional component comprises a third thermoplastic. If the composition comprises more than one additional component the additional components may be added together or separately. Changing the amount and/or the identity of the additional component being added can simply and easily vary the makeup of the extruded composition. Thus differing grades of a material can be produced without shutting down the production line. During the switch to producing a different composition the produced material may be fed back to the melt-mixing device to prevent waste. The amount of material that is fed back to the melt mixing device depends upon the design of the device (screw speed and screw design in an extruder) and can be readily determined by one of ordinary skill in the art.

The term poly(arylene ether) includes polyphenylene ether (PPE) and poly(arylene ether) copolymers; graft copolymers; poly(arylene ether) ether ionomers; block copolymers of alkenyl aromatic compounds, vinyl aromatic compounds, and poly(arylene ether); and combinations comprising at least one of the foregoing. Poly(arylene ether)s per se, are known polymers comprising a plurality of structural units of the formula (I):

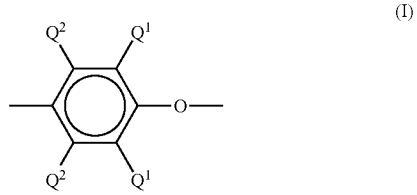

(I)

wherein for each structural unit, each $Q^1$ is independently hydrogen, halogen, primary or secondary lower alkyl (e.g., alkyl containing up to 7 carbon atoms), phenyl, haloalkyl, aminoalkyl, hydrocarbonoxy, halohydrocarbonoxy wherein at least two carbon atoms separate the halogen and oxygen atoms, or the like; and each $Q^2$ is independently hydrogen, halogen, primary or secondary lower alkyl, phenyl, haloalkyl, hydrocarbonoxy, halohydrocarbonoxy wherein at least two carbon atoms separate the halogen and oxygen atoms, or the like. In one embodiment, each $Q^1$ is alkyl or phenyl, especially $C_{1-4}$ alkyl, and each $Q^2$ is hydrogen.

Both homopolymer and copolymer poly(arylene ether) are included. Exemplary homopolymers include those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s further include combinations comprising at least one of the above.

The poly(arylene ether) generally has a number average molecular weight of about 3,000-40,000 atomic mass units (amu) and a weight average molecular weight of about 20,000-80,000 amu, as determined by gel permeation chromatography. The poly(arylene ether) may have an intrinsic viscosity of about 0.10 to about 0.60 deciliters per gram (dl/g), or, more specifically, about 0.29 to about 0.48 dl/g, as measured in chloroform at 25° C. It is also possible to utilize a high intrinsic viscosity poly(arylene ether) and a low intrinsic viscosity poly(arylene ether) in combination. Determining an exact ratio, when two intrinsic viscosities are used, will depend somewhat on the exact intrinsic viscosities of the poly(arylene ether) used and the ultimate physical properties that are desired.

Poly(arylene ether) is typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful poly(arylene ether) for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one aminoalkyl-containing and/or 4-hydroxybiphenyl end groups.

Based upon the foregoing, it will be apparent to those skilled in the art that the contemplated poly(arylene ether) resin may include many of those poly(arylene ether) resins presently known, irrespective of variations in structural units or ancillary chemical features.

The poly(arylene ether) is present in the concentrate in an amount of about 50 to about 99 weight percent based on the total weight of the concentrate. Within this range the poly (arylene ether) may be present in an amount greater than or equal to about 50, or, more specifically, preferably greater than or equal to about 60, or, even more specifically, and more preferably greater than or equal to about 80 weight percent. Also within this range the poly(arylene ether) may be present in an amount less than or equal to about 95, or more specifically, less than or equal to about 90 weight percent.

The term "poly(alkenyl aromatic) resin" as used herein includes polymers prepared by methods known in the art including bulk, suspension, and emulsion polymerization, which contain at least 25% by weight of structural units derived from an alkenyl aromatic monomer of the formula

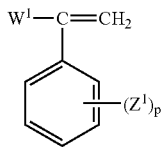

wherein $W^1$ is hydrogen, $C_1$-$C_8$ alkyl, or halogen; $Z^1$ is vinyl, halogen or $C_1$-$C_8$ alkyl; and p is 0 to 5. Exemplary alkenyl aromatic monomers include styrene, chlorostyrene, and vinyltoluene. The poly(alkenyl aromatic) resins include homopolymers of an alkenyl aromatic monomer; random copolymers of an alkenyl aromatic monomer, such as styrene, with one or more different monomers such as acrylonitrile, butadiene, alpha-methylstyrene, ethylvinylbenzene, divinylbenzene and maleic anhydride; and rubber-modified poly (alkenyl aromatic) resins comprising blends and/or grafts of a rubber modifier and a homopolymer of an alkenyl aromatic monomer (as described above), wherein the rubber modifier may be a polymerization product of at least one $C_4$-$C_{10}$ non-aromatic diene monomer, such as butadiene or isoprene, and wherein the rubber-modified poly(alkenyl aromatic) resin comprises about 98 to about 70 weight percent of the homopolymer of an alkenyl aromatic monomer and about 2 to about 30 weight percent of the rubber modifier, or more specifically, about 88 to about 94 weight percent of the homopolymer of an alkenyl aromatic monomer and about 6 to about 12 weight percent of the rubber modifier wherein the weight percents are based on the total weight of the rubber-modified poly(alkenyl aromatic) resin.

The stereoregularity of the poly(alkenyl aromatic) resin may be atactic or syndiotactic. Highly preferred poly(alkenyl aromatic) resins include atactic and syndiotactic homopolystyrenes. Suitable atactic homopolystyrenes are commercially available as, for example, EB3300 from Chevron, and P1800 from BASF. Suitable syndiotactic homopolystyrenes are commercially available from Dow Chemical Company and from Idemitsu Kosan Company, Ltd. Highly preferred poly(alkenyl aromatic) resins further include the rubber-modified polystyrenes, also known as high-impact polystyrenes or HIPS, comprising about 88 to about 94 weight percent polystyrene and about 6 to about 12 weight percent polybutadiene. These rubber-modified polystyrenes are commercially available as, for example, GEH 1897 from General Electric Plastics, and BA 5350 from Chevron.

The concentrate may comprise the poly(alkenyl aromatic) resin in an amount of about 3 to about 50 weight percent based on the total weight of the concentrate. Within this range the poly(alkenyl aromatic) resin may be present in an amount greater than or equal to about 5, or, more specifically, greater than or equal to about 10, or even more specifically, greater than or equal to about 15 weight percent. Also within this range the poly(alkenyl aromatic) resin may be present in an amount less than or equal to about 50, or, more specifically, less than or equal to about 40, or, even more specifically less than or equal to about 25 weight percent.

Polyamide resins are a generic family of resins known as nylons, characterized by the presence of an amide group (—C(O)NH—). Nylon-6 and nylon-6,6 are the generally preferred polyamides and are available from a variety of commercial sources. Other polyamides, however, such as nylon-4,6, nylon-12, nylon-6,10, nylon 6,9, nylon 6/6T and nylon 6,6/6T with triamine contents below about 0.5 weight percent, as well as others, such as the amorphous nylons may be useful for particular PPO-polyamide applications. Mixtures of various polyamides. as well as various polyamide copolymers, are also useful. The most preferred polyamide is polyamide-6,6.

The polyamides can be obtained by a number of well known processes such as those described in U.S. Pat. Nos. 2,071,250; 2,071,251; 2,130,523; 2,130,948; 2,241,322; 2,312,966; and 2,512,606. Nylon-6, for example, is a polymerization product of caprolactam. Nylon-6,6 is a condensation product of adipic acid and 1,6-diaminohexane. Likewise, nylon 4,6 is a condensation product between adipic acid and 1,4-diaminobutane. Besides adipic acid, other useful diacids for the preparation of nylons include azelaic acid, sebacic acid, dodecane diacid, as well as terephthalic and isophthalic acids, and the like. Other useful diamines include m-xylene diamine, di-(4-aminophenyl)methane, di-(4-aminocyclohexyl)methane; 2,2-di-(4-aminophenyl)propane, 2,2-di-(4-aminocyclohexyl)propane, among others. Copolymers of caprolactam with diacids and diamines are also useful.

Polyamides having viscosity of up to about 400 ml/g can be used, or, more specifically, having a viscosity of about 90 to about 350 ml/g, or, even more specifically, about 110 to about 240 ml/g, as measured in a 0.5 wt % solution in 96 wt % sulphuric acid in accordance with ISO 307.

The concentrate may comprise polyamide in an amount of about 5 to about 50 weight percent, based on the total weight of the concentrate. Within this range polyamide may be present in an amount greater than or equal to about 7, or, more specifically, greater than or equal to about 10, or, even more specifically, greater than or equal to about 15 weight percent. Also within this range polyamide may be present in an amount less than or equal to about 45, or more specifically, less than or equal to about 35, or even more specifically, less than or equal to about 25 weight percent.

In compositions comprising poly(arylene ether) and polyamide a compatibilizing agent may be present, preferably in the concentrate, to improve the physical properties of the polyphenylene ether-polyamide resin blend, as well as to enable the use of a greater proportion of the polyamide component. When used herein, the expression "compatibilizing agent" refers to those polyfunctional compounds which interact with the polyphenylene ether, the polyamide, or, preferably, both. This interaction may be chemical (e.g. grafting) or physical (e.g. affecting the surface characteristics of the dispersed phases). In either case the resulting polyphenylene ether-polyamide composition appears to exhibit improved compatibility, particularly as evidenced by enhanced impact strength, mold knit line strength and/or elongation. As used herein, the expression "compatibilized polyphenylene ether-polyamide base resin" refers to those compositions which have been physically or chemically compatibilized with an agent as discussed above, as well as those compositions which are physically compatible without such agents, as taught, for example, in U.S. Pat. No. 3,379,792.

Suitable compatibilizing agents include, for example, liquid diene polymers, epoxy compounds, oxidized polyolefin wax, quinones, organosilane compounds, polyfunctional compounds, and functionalized polyphenylene ethers obtained by reacting one or more of the previously mentioned compatibilizing agents with polyphenylene ether. Use of compatibilizing agent is well known and readily determinable by one of ordinary skill in the art. In one embodiment the compatibilizing agent comprise citric acid, maleic anhydride or a combination thereof.

Polyolefins have the general structure: $C_nH_{2n}$ and include polyethylene, polypropylene and polyisobutylene with preferred homopolymers being polyethylene, LLDPE (linear low density polyethylene), HDPE (high density polyethylene) and MDPE (medium density polyethylene) and isotatic polypropylene. Polyolefin resins of this general structure and methods for their preparation are well known in the art and are described for example in U.S. Pat. Nos. 2,933,480, 3,093,621, 3,211,709, 3,646,168, 3,790,519, 3,884,993, 3,894,999, 4,059,654, 4,166,055 and 4,584,334.

Copolymers of polyolefins may also be used such as copolymers of ethylene and alpha olefins like propylene, 4-methylpentene-1 and octene. Copolymers of ethylene and $C_3$-$C_{10}$ monoolefins and non-conjugated dienes, herein referred to as EPDM copolymers, are also suitable. Examples of suitable $C_3$-$C_{10}$ monoolefins for EPDM copolymers include propylene, 1-butene, 2-butene, 1-pentene, 2-pentene, 1-hexene, 2-hexene and 3-hexene. Suitable dienes include 1,4 hexadiene and monocylic and polycyclic dienes. Mole ratios of ethylene to other $C_3$-$C_{10}$ monoolefin monomers can range from 95:5 to 5:95 with diene units being present in the amount of from 0.1 to 10 mol %. EPDM copolymers can be functionalized with an acyl group or electrophilic group for grafting onto the polyphenylene ether as disclosed in U.S. Pat. No. 5,258,455.

The concentrate may comprise polyolefin in an amount of about 5 to about 80 weight percent, based on the total weight of the concentrate. Within this range polyolefin may be present in an amount greater than or equal to about 5, or, more specifically, greater than or equal to about 30, or, even more specifically, greater than or equal to about 50 weight percent. Also within this range polyolefin may be present in an amount less than or equal to about 80, or, more specifically, less than or equal to about 70, or, even more specifically less than or equal to about 60 weight percent.

The concentrate comprises one or more additives including, but not limited to, coupling agents, antioxidants, mold release agents, UV absorbers, light stabilizers, lubricants, plasticizers, pigments, fire retardants, dyes, colorants, antistatic agents, nucleating agents anti-drip agents, acid scavengers, and combinations of two or more of the foregoing.

The concentrate may comprise an additive or combination of additives in an amount of about 1 to about 25 weight percent based on the total weight of the concentrate. Within this range the combination of additives may be present in an amount greater than or equal to about 2, or, more specifically, greater than or equal to about 5, or even more specifically greater than or equal to about 10. Also within this range the combination of additives may be present in an amount less than or equal to about 23, or, more specifically, less than or equal to about 20 or, even more specifically, less than or equal to about 15 weight percent.

The concentrate may optionally contain an impact modifier. Impact modifiers include olefin-containing copolymers such as olefin acrylates and olefin diene terpolymers. An example of an olefin acrylate copolymer impact modifier is ethylene ethylacrylate copolymer available from Union Carbide as DPD-6169. Other higher olefin monomers can be employed as copolymers with alkyl acrylates, for example, propylene and n-butyl acrylate. Olefin diene terpolymers known in the art and generally fall into the EPDM (ethylene propylene diene monomer) family of terpolymers. They are commercially available such as, for example, EPSYN 704 from Copolymer Rubber Company. In some embodiments one EPDM polymer may be employed as the polyolefin component and a separate EPDM polymer employed as an impact modifer.

Various rubber polymers and copolymers can also be employed as impact modifiers. Examples of such rubber polymers are polybutadiene, polyisoprene, and various other polymers or copolymers having a rubbery dienic monomer, for example random copolymers of styrene and butadiene (SBR).

Other suitable thermoplastic impact modifiers are block copolymers, for example, A-B diblock copolymers and A-B-A triblock copolymers having of one or two alkenyl aromatic blocks A, which are typically styrene blocks, and a rubber block, B, which is typically an isoprene or butadiene block. The butadiene block may be partially hydrogenated. Mixtures of these diblock and triblock copolymers are especially useful.

Suitable A-B and A-B-A copolymers include but are not limited to polystyrene-polybutadiene, polystyrene-poly(ethylene-propylene), polystyrene-polyisoprene, poly($\alpha$-methylstyrene)-polybutadiene, polystyrene-polybutadiene-polystyrene (SBS), polystyrene-poly(ethylene-propylene)-polystyrene, polystyrene-poly(ethylene-butylene)-polystyrene, polystyrene-polyisoprene-polystyrene and poly(alpha-methylstyrene)-polybutadiene-poly(alpha-methylstyrene), as well as the selectively hydrogenated versions thereof, and the like. Mixtures of the aforementioned block copolymers are also useful. Styrene-containing polymers can also be used as impact modifiers.

Other copolymers containing vinyl aromatic compounds, for example styrene, para-methyl styrene, or alpha methyl styrene and vinyl cyanides, for example acrylonitrile or methacyrlonitrile, may also be useful as impact modifiers. One example is styrene-acrylonitrile (SAN), comprising 15 to 30 percent by weight acrylonitrile (AN) with the remainder styrene. The SAN may be further modified by grafting to a rubbery substrate such as a 1,4-polybutadiene to produce a rubber graft polymer, e.g, acrylonitrile-butadiene-styrene (ABS), and methacrylonitrile-butadiene-styrene (MBS). High rubber content (greater than about 50 wt. %) resins of this type (e.g., HRG-ABS) may be especially useful.

These types of polymers are often available as core-shell polymers. The core usually consists substantially of an acrylate rubber or a butadiene rubber, wherein one or more shells have been grafted on the core. Usually these shells are built up from a vinylaromatic compound, a vinylcyanide, an alkyl acrylate or methacrylate, acrylic acid, methacrylic acid, or a combination of the foregoing. The core and/or the shell(s) often comprise multi-functional compounds that may act as a cross-linking agent and/or as a grafting agent. These polymers are usually prepared in several stages.

Other known impact modifiers include various elastomeric materials such as organic silicone rubbers, elastomeric fluorohydrocarbons, elastomeric polyesters, random block polysiloxane-polycarbonate copolymers, and the like. Preferred organopolysiloxane-polycarbonate block copolymers are the dimethylsiloxane-polycarbonate block copolymers.

The concentrate may comprise the optional impact modifier in an amount of about 1 to about 10 weight percent based on the total weight of the concentrate. Within this range impact modifier may be present in an amount greater than or equal to about 2, or, more specifically, greater than or equal to about 3 weight percent. Also within this range impact modifier may be present in an amount less than or equal to about 9, or, more specifically, less than or equal to about 8, or, even more specifically, less than or equal to about 5 weight percent.

Impact modifier may also be added to the concentrate to form the composition, either as the third thermoplastic or in addition to the third thermoplastic. The amounts of impact modifier added to the concentrate will depend upon the type of impact modifier and the desired properties of the final composition.

As mentioned above, reinforcing agent, electrically conductive filler, non-electrically conductive filler, reinforcing agent flame retardant, a third thermoplastic or a combination of the foregoing may be added to the concentrate.

Reinforcing agents may be defined as particulate materials that increase strength or improve another mechanical property. Reinforcing agents include materials such as, for example, silicates, fibers, glass fibers (including continuous and chopped fibers), carbon fibers, carbon nanotubes, graphite, mica, clay, talc, aramid fibers and combinations of two or more of the foregoing.

Electrically conductive fillers include, but are not limited to, metal flake, metal powder and conductive carbon black. Some materials, such as carbon nanotubes and metal fiber can function as both a reinforcing agent and a conductive filler.

Non-electrically conductive fillers include, but are not limited to, metal oxides such as titanium dioxide, non-conductive carbon black, calcium carbonate, or talc. Non electrically conductive fillers are typically used to change the color, density or other non-mechanical property of the composition.

Flame retardants include a range of materials including organic phosphate flame retardants. An organic phosphate flame retardant is phosphate compound of the formula (I):

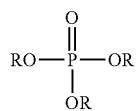

(I)

where R is the same or different and is alkyl, cycloalkyl, aryl, alkyl substituted aryl, halogen substituted aryl, aryl substituted alkyl, halogen, or a combination of any of the foregoing. In one embodiment at least one R is aryl.

Examples include phenyl bisdodecyl phosphate, phenyl-bisneopentyl phosphate, phenyl-bis(3,5,5'-tri-methyl-hexyl phosphate), ethyldiphenyl phosphate, 2-ethyl-hexyldi(p-tolyl) phosphate, bis-(2-ethylhexyl) p-tolylphosphate, tritolyl phosphate, bis-(2-ethylhexyl)phenyl phosphate, tri-(nonylphenyl)phosphate, di-(dodecyl) p-tolyl phosphate, tricresyl phosphate, triphenyl phosphate, dibutylphenyl phosphate, 2-chloroethyldiphenyl phosphate, p-tolyl bis(2,5,5'-trimethylhexyl) phosphate, 2-ethylhexyldiphenyl phosphate, and the like. In another embodiment each R is aryl.

Alternatively, the organic phosphate can be a di- or polyfunctional compound or polymer having the formula

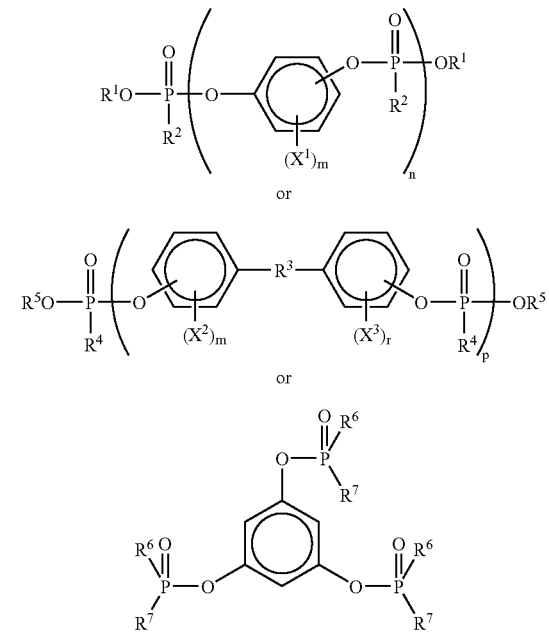

including mixtures thereof, in which $R^1$, $R^3$ and $R^5$ are, independently, hydrocarbon; $R^2$, $R^4$, $R^6$ and $R^7$ are, independently, hydrocarbon or hydrocarbonoxy; $X^1$, $X^2$ and $X^3$ are halogen; m and r are 0 or integers from 1 to 4, and n and p are from 1 to 30.

Examples include the bis diphenyl phosphates of resorcinol, hydroquinone and bisphenol-A, respectively, or their polymeric counterparts.

Methods for the preparation of the aforementioned di- and polyfunctional aromatic phosphates are described in British Patent No. 2,043,083.

Another development is the use of certain cyclic phosphates, for example, diphenyl pentaerythritol diphosphate, as a flame retardant agent for poly(arylene ether) resins, as is described by Axelrod in U.S. Pat. No. 4,254,775.

Also suitable as flame-retardant additives are compounds containing phosphorus-nitrogen bonds, such as phosphonitrilic chloride, phosphorus ester amides, phosphoric acid amides, phosphonic acid amides, phosphinic acid amides, tris(aziridinyl)phosphine oxide, or tetrakis(hydroxymethyl) phosphonium chloride. These flame-retardant additives are commercially available.

In one embodiment the phosphate flame retardants include those based upon resorcinol such as, for example, resorcinol tetraphenyl diphosphate, those based upon bis-phenols such as, for example, bis-phenol A tetraphenyl diphosphate and triphenyl phosphates which may be substituted or unsubstituted. The flame retardant may also comprise a combination of two or more of the foregoing.

In the final composition, the flame retardant, when employed, is present in at least the minimum amount necessary to impart a degree of flame retardancy to the composition to pass the UL-94 protocol at a rating of V-0, V-1, or V-2 depending on the specific application requirements. The particular amount will vary, depending on the molecular weight of the organic phosphate, the amount of the flammable resin present and possibly other normally flammable ingredients which might also be included in the composition. The organic phosphate flame retardants are generally present in compositions in amounts of about 2 to about 35 weight percent, or, more specifically, about 5 to about 30 weight percent, ore even more specifically, about 10 to about 25 weight percent based on the total weight of the composition.

In some embodiments it is desirable for the final composition to have a heat deflection temperature (HDT) of about 70° C. to about 130° C. as determined at 1.8 mega Pascals (MPa) by ASTM D648. The concentrate may have an HDT significantly higher than the HDT of the final composition.

The method is further illustrated by the following non-limiting examples.

EXAMPLES

The materials employed in the following examples are listed in Table 1.

TABLE 1

| COMPONENT | DESCRIPTION/SUPPLIER |
|---|---|
| PPO | Poly(arylene ether) having an intrinsic viscosity of 0.40 dl/g as measured in chloroform at 25° C. |
| ZnS | Zinc sulfide |
| TSAN | Polytetrafluoroethylene encapsulated in styrene-acrylonitrile resin at a weight ratio of 1:1. |
| TDP | Triisodecyl phosphite |
| MgO | Magnesium oxide |
| PE | Polyethylene |
| SBS | Styrene-butadiene-styrene block copolymer |
| HIPS | Rubber modified polystyrene |
| RDP | Resorcinol diphosphate |
| BPADP | Bisphenol A diphosphate |

Example 1

A concentrate as shown in Table 1 was melt mixed and pelletized. Amounts shown in Table 2 are in weight percent, based on the total weight of the concentrate. The concentrate was used in later examples.

TABLE 2

| COMPONENT | AMOUNT |
|---|---|
| PPO | 74.7 |
| ZnS | 0.15 |
| TSAN | 0.19 |
| TDP | 0.65 |
| MgO | 0.15 |
| PE | 2.1 |
| SBS | 3.3 |
| HIPS | 18.7 |

Examples 2-4

The concentrate from Example 1 was melt mixed with additional rubber modified polystyrene as shown in Table 3. The amount of rubber modified polystyrene is the amount of additional rubber modified polystyrene in weight percent based on the total weight of the composition. The compositions were molded and tested. The concentrate itself was molded and tested for comparison.

TABLE 3

|  | 2 | 3 | 4 |
|---|---|---|---|
| HIPS | 0 | 25 | 50 |
| Tensile yield strength[1] | 70 | 64 | 55 |
| Tensile elongation[1] | 21.4 | 21.0 | 23.7 |
| Flexural modulus[2] | 2,540 | 2,490 | 2,450 |
| Flexural yield strength[2] | 108 | 98 | 85 |
| Notched Izod[3] | 125 | 167 | 230 |
| HDT[4] | 153 | 136 | 119 |

[1]Determined according to ASTM D638. Yield strength is in MPa. Elongation is in percent.
[2]Determined according to ASTM D790. Results are in MPa.
[3]Determined according to ASTM D256. Results are in joules per meter (J/m).
[4]Determined according to ASTM D648 at 1.8 MPa and 0.64 centimeters (cm). Results are in ° C.

Examples 2-4 show that performance varies in a substantially linear fashion based on the amount of additional rubber modified polystyrene.

Examples 5-16

The concentrate from Example 1 was melt mixed with additional rubber modified polystyrene and RDP as shown in Table 4. The added amount of RDP and rubber modified polystyrene are in weight percent based on the total weight of the composition. The compositions were molded and tested.

Flammability results are reported as "probability of first time pass" or p (FTP). Twenty bars were burned by the UL 94 method and the average and standard deviation of the flame out times was used to calculate the probability that in the standard test of five bars the sample would have received a V-0 rating (p(FTP) V0) or a V-1 rating (p(FTP)V1). A 90% or greater probability of passing the first time (i.e., p(FTP) of 0.9 or greater) is considered acceptable performance. Values significantly lower than 0.9 are considered unacceptable. p(FTP) is calculated only for samples that do not fail by dripping. Flammability results were obtained for bars with thickness of 1.5 mm.

TABLE 4

|  | 5 | 6 | 7 | 8 | 9 | 10 | 11 | 12 | 13 | 14 |
|---|---|---|---|---|---|---|---|---|---|---|
| HIPS | 25 | 18.75 | 0 | 12.5 | 12.5 | 0 | 0 | 25 | 6.25 | 25 |
| Concentrate | 57.5 | 69.5 | 82.5 | 81.5 | 70 | 88.25 | 94 | 69 | 82 | 63.25 |
| RDP | 17.5 | 11.75 | 17.5 | 6 | 17.5 | 11.75 | 6 | 6 | 11.75 | 11.75 |
| p(FTP) V0 | 0.98 | 0.326 | 1.00 | 0 | 0.986 | 0.627 | 0 | 0 | 0 | 0.397 |
| p(FTP) V1 | 1.00 | .999 | 1.00 | 0.815 | 1.00 | 1.00 | 0.877 | 0.914 | 0.805 | 0.998 |
| Specific gravity | 1.12 | 1.11 | 1.14 | 1.10 | 1.13 | 1.12 | 1.10 | 1.10 | 1.12 | 1.11 |
| Tensile yield strength[1] | 58 | 63 | 68 | 67 | 63 | 70 | 73 | 60 | 68 | 60 |

TABLE 4-continued

| | 5 | 6 | 7 | 8 | 9 | 10 | 11 | 12 | 13 | 14 |
|---|---|---|---|---|---|---|---|---|---|---|
| Tensile elongation[1] | 16.2 | 19.5 | 15.7 | 18.3 | 18.2 | 19.4 | 15.3 | 24.6 | 18.2 | 21.4 |
| Flexural modulus[2] | 2550 | 2590 | 2570 | 2560 | 2470 | 2490 | 2540 | 2570 | 2490 | 2540 |
| Flexural yield strength[2] | 86 | 96 | 104 | 101 | 94 | 106 | 109 | 92 | 101 | 91 |
| Notched Izod[3] | 103 | 120 | 107 | 145 | 111 | 105 | 111 | 143 | 113 | 136 |
| Heat deflection temperature[4] | 82 | 98 | 95 | 123 | 88 | 12 | 130 | 114 | 109 | 95 |

[1]Determined according to ASTM D638. Yield strength is in MPa. Elongation is in percent.
[2]Determined according to ASTM D790. Results are in MPa.
[3]Determined according to ASTM D256. Results are in J/m.
[4]Determined according to ASTM D648 at 1.8 MPa and 0.64 cm. Results are in ° C.

As can be seen by Examples 5-14 a range of compositions with a range of physical properties can be made using a single concentrate.

Examples 15-24

The concentrate from Example 1 was melt mixed with additional rubber modified polystyrene and BPADP as shown in Table 5. The added amount of RDP and rubber modified polystyrene is in weight percent based on the total weight of the composition. The compositions were molded and tested. Flame retardance was determined as in Examples 5-14.

TABLE 5

| | 15 | 16 | 17 | 18 | 19 | 20 | 21 | 22 | 23 | 24 |
|---|---|---|---|---|---|---|---|---|---|---|
| HIPS | 25 | 18.75 | 0 | 12.5 | 12.5 | 0 | 0 | 25 | 6.25 | 25 |
| Concentrate | 57.5 | 69.5 | 82.5 | 81.5 | 70 | 88.25 | 94 | 69 | 82 | 63.25 |
| BPADP | 17.5 | 11.75 | 17.5 | 6 | 17.5 | 11.75 | 6 | 6 | 11.75 | 11.75 |
| p(FTP) V0 | 0.692 | 0.583 | 1.000 | 0 | 0.938 | 0.104 | 0 | 0 | 0.005 | 0.016 |
| p(FTP) V1 | 0.996 | 1.000 | 1.000 | 0.471 | 1.00 | 0.986 | 0.714 | 0.283 | 0.970 | 0.912 |
| Specific gravity | 1.11 | 1.11 | 1.28 | 1.09 | 1.12 | 1.11 | 1.10 | 1.09 | 1.11 | 1.11 |
| Tensile yield strength[1] | 62 | 66 | 73 | 67 | 69 | 73 | 73 | 61 | 69 | 68 |
| Tensile elongation[1] | 18.18 | 16.19 | 12.34 | 1.76 | 14.05 | 13.21 | 14.82 | 23.52 | 12.68 | 16.44 |
| Flexural modulus[2] | 2680 | 2690 | 2780 | 2510 | 2760 | 2630 | 2590 | 2450 | 2580 | 2650 |
| Flexural yield strength[2] | 87 | 101 | 113 | 103 | 103 | 110 | 112 | 95 | 107 | 97 |
| Notched Izod[3] | 125 | 132 | 113 | 139 | 114 | 117 | 129 | 163 | 127 | 160 |
| Heat deflection temperature[4] | 84 | 101 | 99 | 125 | 94 | 117 | 135 | 119 | 114 | 101 |

[1]Determined according to ASTM D638. Yield strength is in MPa. Elongation is in percent.
[2]Determined according to ASTM D790. Results are in MPa.
[3]Determined according to ASTM D256. Results are in J/m.
[4]Determined according to ASTM D648 at 1.8 MPa and 0.64 cm. Results are in ° C.

Similar to Examples 5-14, Examples 15-24 show that a range of compositions with a range of physical properties can be made using a single concentrate regardless of the choice of flame retardant.

Example 25

A sample of 0.40 IV polyphenylene ether powder with a butyraldehyde level of 114 parts per million by weight was extruded on a 53 millimeter (mm) twin screw extruder at a rate of 50 kilograms per hour (kg/hr), a screw speed of 310 rotations per minute (rpm), and a barrel temperature of 290° C. The extruder used 2 separate water injection zones each followed by a vacuum vent. Water was injected at a rate of 1.5 kg/hr into each zone with a vacuum vent pressure of 950 millibar of vacuum. The extruded product was pelletized and a portion was re-extruded under the same conditions. This process was repeated 2 more times. The level of butyraldehyde and other volatiles in the samples is shown in Table 6.

TABLE 6

| Sample | Butyraldehyde in ppm | Trimethylanisole in ppm | Toluene in ppm |
|---|---|---|---|
| Powder feed | 114 | 26 | 187 |
| 1st extrusion pellets | 134 | 1.1 | 26 |
| 2nd extrusion pellets | 49 | 0.2 | 0 |
| 3rd extrusion pellets | 25 | 0 | 0 |
| 4th extrusion pellets | 14 | 0 | 0 |

As seen in Table 6, although the level of trimethylanisole and toluene decreased after the first extrusion with water injection, the level of butyraldehyde was not reduced until after 2 extrusion steps.

Example 26

A sample of 0.40 IV polyphenylene ether powder with a butyraldehyde level of 48 parts per million was extruded on a 30 mm twin screw extruder at a rate of 13.6 kg/hr, a screw speed of 300 rpm, and a barrel temperature of 315° C. The extruder used a single vacuum vent operated at 600 millibar of vacuum. The extruded product was pelletized and a portion was re-extruded under the same conditions. This process was repeated 2 more times. An additional powder sample was extruded once under the conditions described above except that the feed rate was 6.8 kg/hr to double the residence time in the extruder. The level of butyraldehyde and other volatiles in the samples is shown in Table 7.

TABLE 7

| Sample | Butyraldehyde in ppm | Trimethylanisole in ppm |
|---|---|---|
| powder feed | 48 | 1.02 |
| 1st extrusion pellets | 746 | 1.48 |
| 2nd extrusion pellets | 490 | 0.88 |
| 3rd extrusion pellets | 235 | 0.44 |
| 4th extrusion pellets | 129 | 0.26 |
| 1st extrusion, double residence time | 663 | 1.2 |

This example again shows that the level of butyraldehyde rises sharply after a single extrusion but begins to drop after multiple passes through the extruder. This example also shows that making the residence time of the first extrusion pass equal to the residence time of two passes is not as effective as two individual extrusions.

Examples 27-34

Samples of a blend of 90 weight percent 0.40 IV polyphenylene ether and 10 weight percent crystal clear polystyrene were extruded on a 28 mm twin screw extruder at a screw speed of 300 rpm, a barrel temperature of 310° C., and rates of 3.0, 7.5, and 12.0 kg/hr. The extruder used an atmospheric vent plus a single vacuum vent operated at 800 millibar of vacuum. The extruded samples were pelletized and re-extruded with additional crystal clear polystyrene, SEBS rubber, glass fibers, and other additives to give a final composition of 34 weight percent polyphenylene ether, 35.5 weight percent polystyrene, 5.5 weight percent rubber, 10 weight percent glass fibers, and 15 weight percent other additives. Additional samples with the same formulation were extruded using polyphenylene ether powder instead of the extruded pellets. These glass filled samples were extruded on a 28 mm twin screw extruder at a rate of 15 g/hr, a screw speed of 300 rpm, and a barrel temperature of 290° C. The extruder used an atmospheric vent plus a single vacuum vent operated at 800 millibar of vacuum. Water was injected into the melt before the vacuum vent at a rate of 0.225 kg/hr to reduce the level of volatile components in the mixture.

The pelletized samples were injection molded into 10 centimeter dics, which were then examined by a panel of trained odor evaluators who gave each sample a score proportional to the intensity of the odor; scores can vary between 1 (no odor) and 6 (unbearable). The sample scores are shown in Table 8.

TABLE 8

| Sample Number | PPO Source for Sample | Odor Score |
|---|---|---|
| 27 | pre-extruded with 10% polystyrene at 12.0 kg/hr | 3.3 |
| 28 | pre-extruded with 10% polystyrene at 7.5 kg/hr | 3.0 |
| 29 | pre-extruded with 10% polystyrene at 3.0 kg/hr | 3.2 |
| 30 | pre-extruded with 10% polystyrene at 3.0 kg/hr | 3.3 |
| 31 | PPO powder | 4.6 |
| 32 | PPO powder | 3.8 |
| 33 | PPO powder | 3.8 |
| 34 | PPO powder | 3.8 |

All of the samples (27-30) made with the polyphenylene ether/polystyrene blend that was extruded once before compounding with additional components exhibited lower odor intensity than samples made directly from polyphenylene ether powder even though steam stripping was employed.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

The invention claimed is:

1. A method of making a thermoplastic composition comprising melt mixing a concentrate comprising a first thermoplastic, a second thermoplastic and an additive with a component selected from the group consisting of a third thermoplastic, fire retardant additive, reinforcing agent, electrically conductive filler, non-electrically conductive filler, and combinations of two or more of the foregoing,
   wherein the first thermoplastic comprises poly(arylene ether),
   wherein the second thermoplastic and third thermoplastic are selected from the group consisting of poly(alkenyl aromatic) homopolymer resin, rubber modified poly (alkenyl aromatic) homopolymer resin, polyamide, polyolefin and combinations of two or more of the foregoing,
   wherein the concentrate is solid prior to melt mixing,
   wherein the concentrate comprises 50 to 99 weight percent poly(arylene ether) based on the total weight of the concentrate, and
   wherein the composition comprises greater than or equal to 34 weight percent poly(arylene ether), based on the total weight of the composition.

2. The method of claim 1, wherein the second and third thermoplastics are the same.

3. The method of claim 1, wherein the second and third thermoplastics are different.

4. The method of claim 1, wherein the second and third thermoplastics comprise rubber modified polystyrene.

5. The method of claim 1, wherein the composition further comprises an impact modifier.

6. The method of claim 5, wherein the concentrate further comprises an impact modifier.

7. The method of claim 6 wherein the impact modifier is present in an amount of about 1 to about 10 weight percent based on the total weight of the concentrate.

8. The method of claim 1, wherein the concentrate is in the form of a dry blend.

9. The method of claim 1, wherein the concentrate is pelletized.

10. The method of claim 1 wherein the second thermoplastic comprises a poly(alkenyl aromatic) resin and the poly(alkenyl aromatic) resin is present in an amount of about 3 to about 50 weight percent based on the total weight of the concentrate.

11. The method of claim 1 wherein the second thermoplastic comprises a polyamide and the polyamide is present in an amount of about 5 to about 50 weight percent based on the total weight of the concentrate.

12. The method of claim 1 wherein the second thermoplastic comprises a polyolefin and the polyolefin is present in an amount of about 5 to about 80 weight percent based on the total weight of the concentrate.

13. The method of claim 1 wherein the additive is present in an amount of about 1 to about 25 weight percent based on the total weight of the concentrate.

14. The method of claim 1 wherein the concentrate comprises a combination of additives and the combination of additives is present in an amount of about 1 to about 25 weight percent based on the total weight of the concentrate.

15. The method of claim 1 wherein the component comprises a third thermoplastic and the composition further comprises a blowing agent.

16. The method of claim 1 wherein the additive is selected from the group consisting of coupling agents, antioxidants, mold release agents, UV absorbers, light stabilizers, heat stabilizers, lubricants, plasticizers, pigments, dyes, colorants, anti-static agents, nucleating agents, anti-drip agents, acid scavengers, and combinations of two or more of the foregoing.

17. A method of making a thermoplastic composition comprising:
dry blending a first thermoplastic, a second thermoplastic and an additive to form a concentrate; and
melt mixing the concentrate with a component selected from the group consisting of a third thermoplastic, fire retardant additive, reinforcing agent, electrically conductive filler, non-electrically conductive filler, and combinations of two or more of the foregoing,
wherein the first thermoplastic comprises poly(arylene ether), and
wherein the second thermoplastic and third thermoplastic are selected from the group consisting of poly(alkenyl aromatic) homopolymer resin, rubber modified poly(alkenyl aromatic) homopolymer resin, polyamide, polyolefin and combinations of two or more of the foregoing,
wherein the concentrate comprises 50 to 99 weight percent poly(arylene ether) based on the total weight of the concentrate, and
wherein the composition comprises greater than or equal to 34 weight percent poly(arylene ether), based on the total weight of the composition.

18. A method of making a thermoplastic composition comprising
melt-mixing a first thermoplastic, a second thermoplastic and an additive to form a molten concentrate;
pelletizing the molten concentrate to form a pelletized concentrate;
melt mixing the pelletized concentrate with a component selected from the group consisting of a third thermoplastic, fire retardant additive, reinforcing agent, electrically conductive filler, non-electrically conductive filler, and combinations of two or more of the foregoing,
wherein the first thermoplastic comprises poly(arylene ether), and
wherein the second thermoplastic and third thermoplastic are selected from the group consisting of poly(alkenyl aromatic) homopolymer resin, rubber modified poly(alkenyl aromatic) homopolymer resin, polyamide, polyolefin and combinations of two or more of the foregoing,
wherein the concentrate comprises 50 to 99 weight percent poly(arylene ether) based on the total weight of the concentrate, and
wherein the composition comprises greater than or equal to 34 weight percent poly(arylene ether), based on the total weight of the composition.

19. The method of claim 18 wherein the thermoplastic composition has a butyraldehyde level less than or equal to about 800 parts per million by weight, based on the total weight of the poly(arylene ether).

20. The method of claim 18 wherein the thermoplastic composition has a trimethylanisole level less than or equal to about 30 parts per million based on the total weight of the poly(arylene ether).

21. The method of claim 18 wherein the thermoplastic composition has a toluene level less than or equal to about 100 parts per million by weight based on the total weight of the poly(arylene ether).

22. A method of injection molding a thermoplastic composition comprising
melt-mixing a first thermoplastic, a second thermoplastic and an additive to form a molten concentrate;
pelletizing the molten concentrate to form a pelletized concentrate;
blending the pelletized concentrate with a component selected from the group consisting of a third thermoplastic, fire retardant additive, reinforcing agent, electrically conductive filler, non-electrically conductive filler, and combinations of two or more of the foregoing to form a blend and
injection molding the blend,
wherein the first thermoplastic comprises poly(arylene ether),
wherein the second thermoplastic and third thermoplastic are selected from the group consisting of poly(alkenyl aromatic) homopolymer resin, rubber modified poly(alkenyl aromatic) homopolymer resin, polyamide, polyolefin and combinations of two or more of the foregoing,
wherein the concentrate comprises 50 to 99 weight percent poly(arylene ether) based on the total weight of the concentrate, and
wherein the composition comprises greater than or equal to 34 weight percent poly(arylene ether), based on the total weight of the composition.

23. A method of making a thermoplastic composition comprising melt mixing a concentrate comprising a poly(arylene ether), a second thermoplastic and an additive with a component selected from the group consisting of a third thermoplastic, fire retardant additive, reinforcing agent, electrically conductive filler, non-electrically conductive filler, and combinations of two or more of the foregoing,
  wherein the second thermoplastic and third thermoplastic are selected from the group consisting of polystyrene, rubber modified polystyrene and combinations thereof,
  wherein the concentrate is solid prior to melt mixing,
  wherein the concentrate comprises 50 to 99 weight percent poly(arylene ether) based on the total weight of the concentrate, and
  wherein the composition comprises greater than or equal to 34 weight percent poly(arylene ether), based on the total weight of the composition.

* * * * *